Nov. 7, 1972 H. K. JOHNSTON ET AL 3,702,273
ETCHING COMPOSITIONS AND METHOD FOR ETCHING CU AND NI BASED METALS AT A UNIFORM RATE
Filed Dec. 21, 1970
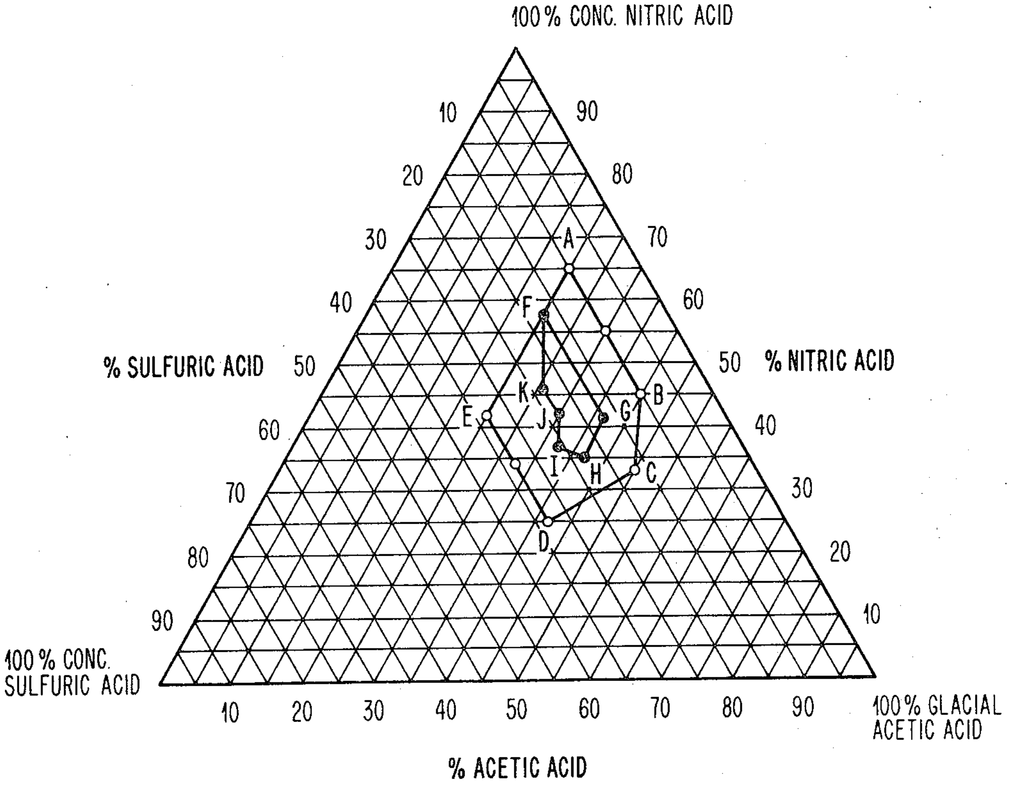
INVENTORS
HAROLD KENNETH JOHNSTON II
THEODORE L. LARSON
BY [signature]
ATTORNEY United States Patent Office 3,702,273
Patented Nov. 7, 1972

3,702,273

ETCHING COMPOSITIONS AND METHOD FOR ETCHING Cu AND Ni BASED METALS AT A UNIFORM RATE

Harold Kenneth Johnston II, North Glenn, and Theodore Lowell Larson, Longmont, Colo., assignors to International Business Machines Corporation, Armonk, N.Y.

Filed Dec. 21, 1970, Ser. No. 100,106
Int. Cl. C23g *1/20*
U.S. Cl. 156—18 10 Claims

ABSTRACT OF THE DISCLOSURE

Composite structures of nickel based metals and copper based metals are utilized for example, in magnetic read/write transducers. The surfaces of such structures are normally finished by grinding. However, grinding sometimes tends to smear the different metals over one another, thus, interfering with their desired electrical and magnetic characteristics. In the present invention, smeared dissimilar metals are removed at a substantially uniform rate by etching with compositions including nitric acid, sulfuric acid, and acetic acid in relative percentages by volume lying within the area defined approximately in the accompanying diagram by the solid lines AB, BC, CD, DE, and EA.

BACKGROUND OF THE INVENTION

Field of the invention

The present invention relates to compositions for use in etching, which compositions include inorganic acids and organic materials. It also relates to the method of using such etching compositions simultaneously on dissimilar metals to provide etching at a substantially uniform rate.

Description of the prior art

In the prior art, etching compositions have been developed primarily with regard to their ability to etch one material at a time. While a single etchant may be determined to be capable of etching many types of material, little effort has been made toward developing etchant systems which are capable of etching two dissimilar metals simultaneously at a uniform rate to achieve, for example, an extremely level common surface. More specifically, this is believed to be the first time an etching composition has been developed for use simultaneously with nickel and its alloys and copper and its alloys to achieve uniform etching and provide flatness to a smeared composite structure of such metals within a range of about 50 to 200 microinches.

As is detailed hereinbelow, the present invention provides etchants composed of nitric acid, acetic acid, and sulfuric acid which achieve these results.

Etching and brightening compositions containing inorganic acids with organic material are known in the art. The compositions detailed herein and their utility for leveling dissimilar metals simultaneously are believed to be new and to possess unexpected properties.

More specifically, in the prior art, bright dipping baths of sulfuric acid, nitric acid, and minor additions of organic compounds are referreed to in U.S. Pat. 2,446,060, for example. However, this reference does not anticipate the specific compositions taught by the present application. Further, this reference indicates quite positively that combinations of sulfuric acid and nitric acid are to be avoided due to their tendency, in combination, to give off fumes of nitrogen dioxide which are corrosive and hazardous. U.S. Pat. 2,680,678 discloses a chemical polish consisting of nitric acid, acetic acid, and a fraction of a percent of hydrochloric acid. The substitution of sulfuric acid for hydrochloric acid is not suggested in this reference. U.S. Pat. 2,940,836 discloses etchant compositions for photoengraving plates consisting of nitric acid, sulfuric acid, and a sulfur containing organic compound. Acetic acid is an organic compound, but does not contain sulfur. Therefore, this reference does not anticipate the present invention. Other references which have been noted as disclosing various cleaning, polishing, and etching compounds, including combinations of acids, which are in some manner similar to the composition of the present invention are U.S. Pats. 2,619,414; 2,662,814; 2,849,297; 2,927,011; and 3,202,612. None of the references noted appear to anticipate the compositions of the present invention or to suggest in any way that such compositions would have the ability to uniformly etch different metals.

SUMMARY OF THE INVENTION

The present invention discloses compositions for use in simultaneously etching nickel and its alloys and copper and its alloys at a substantially equal rate. The compositions are ternary etchants containing, in parts by volume, at least between about 25% and 65% concentrated nitric acid, between about 25% and 50% glacial acetic acid, and between about 10% and 33% concentrated sulfuric acid, or their equivalents. When used with a structure consisting of associated copper based and nickel based metals, these etching compositions react with both types of metal at a substantially equal rate to provide a smooth and even surface. This property is especially useful in repairing and enhancing magnetic read/write transducers wherein during finish grinding operations adjacent copper based and nickel based portions are smeared over one another to cause a loss of desired electrical and magnetic characteristics. The present invention is also useful for etching copper based and nickel based metals separately, for etching other types of metals, and in etching other types of composite structures, such as transformerms, motors, generators, and similar electro-magnetic equipment.

The foregoing features and advantages of the invention will be apparent from the following more particular description of preferred embodiments of the invention as illustrated in the accompanying drawing.

BRIEF DESCRIPTION OF THE DRAWING

The single figure represents a triaxial diagram showing the relative proportions of nitric acid, acetic acid, and sulfuric acid applicable for use in etching compositions coming within the scope of this invention. In the diagram, the respective sides of the triangle indicate the volume percentages of concentrated nitric acid, glacial acetic acid, and concentrated sulfuric acid, each from 0 %to 100%.

DESCRIPTION OF THE PREFERRED EMBODIMENT

The compositions that are operative for the etching of composite nickel based and copper based metals at a substantially equal rate are approximately defined on the triaxial diagram by the solid lines AB, BC, CD, DE, and EA. Each of the points on the diagram represent the approximate limits of the compositions of the present invention as determined experimentally. Any composition found within the area defined by these solid lines will be operative to etch nickel based metals and copper based metals at a substantially equal rate.

Although fully satisfactory etching is obtained within the range above-described, in order to secure the very best results, with the most desirable reaction rates and the greatest uniformity and reproducibility in operation, a somewhat narrower range of compositions has been determined. It has been found that the range of proportions of nitric acid, acetic acid, and sulfuric acid may advantageously be kept within the narrower limits represented on the accompanying diagram by the area approximately defined by lines FG, GH, HI, IJ, JK, and KF. As with the broader range, each of the limits in this narrower range has also been determined experimentally, and the representative points are disclosed in detail in the following examples. The most preferred compositions of etching baths for simultaneously etching nickel based and copper based alloys, with respect to the relative proportions of nitric acid, acetic acid, and sulfuric acid lie within this second lesser area which is wholly enclosed within the broader area first defined.

The present invention is especially defined with respect to its applicability to nickel based and copper based metals. The term "nickel based" metals is especially intended to include pure nickel and nickel-iron alloy compositions, including such alloy compositions containing 1% to about 15% of one or more added elements, such as molybdenum, chromium, manganese, copper, palladium, titanium, silicon, aluminum, and tungsten. Also, included within the term "nickel based" metals are the iron-nickel-cobalt alloy compositions, including compositions containing 1% to about 15% of added elements. All of the foregoing materials are generally magnetically soft and are utilized in many electrical and magnetic structures. The "copper based" materials include pure copper and copper based alloys generally known as brass. Most commonly, brass is an alloy of copper with zinc or tin. However, the brasses of copper with aluminum, iron, and other metals are included within the definition of "copper based" metals as used herein. The copper based metals are generally good electrical conductors and are also used in many electro-magnetic structures. Furthermore, as previously noted, while the present invention is primarily directed to the simultaneous etching of copper based and nickel based composite articles at a uniform rate, it is also suitable for etching either type of metal singularly, or other metals or groups of metals.

As is apparent from the diagram, the make up of the etching compositions of the present invention has sufficient latitude to enable commercial operation without prohibitively stringent control. In general, considering only the relative proportions of the three primary components, the composition may range very broadly from about 25% to 65% nitric acid, about 25% to 50% acetic acid, and about 10% to 33% sulfuric acid.

Although the accompanying triaxial diagram shows the relative proportions of nitric acid, acetic acid and sulfuric acid in a system consisting only of these three components, water may also be present. For example, a bath containing a ratio of nitric acid, acetic acid, and sulfuric acid selected from the diagram may be diluted with a certain amount of water. The amount of water that may be added without impairing the character of the etchant solution depends to a large extent upon the etching rate desired. For example, the compositions may be used without any added water. Conversely, the compositions may be diluted to the point where they represent as little as 1% or less of a water solution. The character of the composition will remain the same under these latter conditions; however, the rate of etch will drop off quite rapidly as such extreme dilutions are approached. In the most preferred embodiments of the present invention, the nitric acid, acetic acid, sulfuric acid composition represents from about 25% to about 50%, by volume, of the etchant bath. By carefully adjusting the concentration of the several ingredients and water finely controlled etching rates can be achieved.

The temperatures at which the etching of copper based and nickel based metals is accomplished in these etching compositions is usually between about 20° C. and 77° C.; although, room temperature is preferred. Ambient temperatures are especially desirable in the practice of the present invention as higher temperatures may result in the production of unwanted and dangerous nitrogen dioxide fumes. At temperatures higher than about 77° C., such fumes may begin to form. The temperature of the etchant compositions will, of course, have an effect on the rate at which etching proceeds.

Depending somewhat upon the temperature at which the bath is operated, upon the etching composition chosen, and upon the concentration of the etching composition, etching is usually completed within about 30 to 90 seconds; although, in some cases, the time of treatment can range from as little as 3 seconds to as much as one-half hour, again depending upon the make up, the concentration, and the temperature of the bath.

In addition to the three major constituents and water, the bath may also include minor amounts of other substances including other organic compounds or other acids or salts. Such additions of minor ingredients which do not change the operation of the bath are within the teaching of the present invention. Regardless of what other non-essential ingredients may be present in the bath, however, the relative proportions that the nitric acid, acetic acid, and sulfuric acid should bear to each other may be obtained from and are defined by the accompanying triaxial diagram.

Unless otherwise specified, all percentages referred to herein will be understood to represent percentages by volume rather than by weight. Also, the terms "nitric acid," "acetic acid," and "sulfuric acid" referred to the respective commercial strength concentrated acids. In other words, "nitric acid" refers to commercial nitric acid which is 70% $HNO_3$, 30% water, and having a specific gravity of approximately 1.42, "acetic acid" refers to commercial glacial acetic acid, having a specific gravity of approximately 1.05, and "sulfuric acid" refers to commercial sulfuric acid consisting of 98% $H_2SO_4$ and having a specific gravity of approximately 1.84. It should also be further understood, that within the broad limits of additional water referred to above, dilute species of the same acids may be used.

As disclosed in the accompanying diagram and discussed herein, the etching compositions of this invention are composed of nitric acid, acetic acid, and sulfuric acid in combination. In general, the bath must contain at least approximately 25% nitric acid, or successful etching will not be obtained. Baths containing less than about 25% nitric acid tend not to etch the nickel based metals. When more than approximately 65% nitric acid is present, the compositions also tend to react only with the copper based metals and to etch the metal surfaces unevenly. However, regardless of the nitric acid content within the ranges taught by the present invention, none of the baths show any tendency toward fuming so long as they are utilized at temperatures below about 77° C. The acetic acid in the bath is quite important in controlling the etch rate between the dissimilar metals. As the concentration of acetic acid is decreased, the etch rate of the copper based metals is increased.

In connection with the foregoing discussion of the effect of the concentration of the various components on the character of the etchant, it will be understood that no shap transition takes place in the nature of the bath at the defined concentration limits. These limits merely define what may be termed "threshold zones," and the satisfactory use of the etchant gradually decreases as these limits are approached and crossed.

It is not necessary to agitate the bath during etching with the herein disclosed compositions. However, moderate agitation can be tolerated. In one aspect of this invention, the etchant compositions may be formed into a thick paste with some non-reactive carrier powder, such as fumed silica, and the paste applied to the to-be-etched surface. Because of its highly viscous nature, such a paste can be accurately applied to a portion of a work piece to achieve etching at that portion only without the necessity of masking the remainder of the work piece. When etching has been completed, such a paste may be quickly and easily washed away with immediate cessation of etching.

Only moderate care is required in the preparation of surfaces to be etched by the compositions of the present invention. In general, it is desirable to remove oil or grease by standard degreasing techniques. With only such simple treatment, a surface is ready for etching as disclosed herein.

No unusual or especially constructed equipment is required for the practice of the present invention. Readily available acid resistant containers are the only materials required. Once etching in accordance with the present invention has been completed, no further special treatment is required.

The following examples are given by way of illustration to show the operation of the etching compositions of the present invention in connection with disclosed copper and nickel based metals.

EXAMPLE 1

A magnetic transducer composed of nine read heads and nine write heads in a copper housing was improperly ground, causing copper to be smeared over several of the heads, and portions of the heads to be smeared over the copper housing. Each head is composed of dozens of laminae of 80% nickel-16% iron-4% molybdenum, each laminae being on the order of about 1 mil thick, the laminae being glued together with epoxy to form a laminated head structure. The head structure is constructed of insulated laminae in this manner in order to avoid the formation of eddy currents which would be present in a solid piece of metal or in the laminated structure if the various laminae were in electrical contact with one another. However, grinding has also caused portions of laminae to be smeared over the glue lines, thus, providing an electrical path from laminae to laminae which allows the formation of eddy currents and therefore reduces the efficiency of the head. The condition of this transducer is such that it cannot be economically reconditioned utilizing mechanical techniques. In order to be rendered useful, this transducer must have the smeared copper and nickel alloys removed from one another, and must also have the smeared laminae repaired so that they no longer make electrical contact with one another, while maintaining a surface smoothness of less than 200 microinches, and preferably of 50 microinches.

A solution consisting of 50 ml. of concentrated nitric acid, 50 ml. glacial acetic acid, and 20 ml. concentrated sulfuric acid was prepared and diluted with 250 ml. of distilled water. Considered in terms of percent by volume, this composition consisted of 41.7% concentrated nitric acid, 41.7% glacial acetic acid, and 16.7% concentrated sulfuric acid, and would coincide with point G on the diagram. The solution consists of slightly more than two parts of water to one part of etchant composition and may be considered to be a 31% etchant solution.

The smeared transducer described above was cleaned and degreased in trichloro-trifluoro-ethane, air dried, and then immersed in the etchant solution for approximately 90 seconds. Following etching, the transducer was removed from the etchant solution and immersed in ammonium hydroxide for several minutes to neutralize the acids. This ammonium hydroxide neutralization is simply a matter of choice, as the reaction may be quickly and efficiently terminated by placing the transducer in flowing water. Subsequent to neutralization, the transducer was rinsed with cold water and dried.

Upon examination under an optical magnification, substantially all traces of smeared copper and nickel alloy were gone. The glue lines between the laminae of the magnetic heads were clearly visible, thus indicating that electrical contact between laminae no longer existed. The flatness of the transducer surface between the copper housing and magnetic heads was found to be approximately 50 microinches. When placed in a magnetic read/write system, the transducer was found to be fully and satisfactorily operative from both a magnetic and electronic point of view.

EXAMPLES 2–16

The following table is a compilation of etchant compositions which have been prepared and tested in accordance with the teaching of the present invention. Generally speaking, the etchant compositions which gave a transducer flatness of approximately 50 microinches, were rated as "good," while an etchant composition giving a flatness between approximately 50 and 200 microinches was rated as "fair." Etchants which were non-reactive with one or more elements of the transducer, or which gave a finished surface flatness to a transducer of greater than 200 microinches, were rated "poor." The details of these examples have been utilized to plot the triaxial diagram in the accompanying figure. The points which were found to be fair have been utilized to designate the approximate composition encompassed by the solids lines AB, BC, CD, DE, and EA. The "good" points have been utilized to define the preferred composition defined approximately by the solid lines FG, GH, HI, IJ, JK, and KF. The "poor" points have not been plotted on the diagram.

| | Etchant, parts by volume (percent) | | | |
|---|---|---|---|---|
| Example number | 70% $HNO_3$ | Glacial acetic acid | 98% $H_2SO_4$ | Results |
| 2 | 34.6 | 42.3 | 23.1 | Good; within 50 microinches. |
| 3 | 42.3 | 34.6 | 23.1 | Do. |
| 4 | 46.2 | 36.7 | 23.1 | Do. |
| 5 | 58.3 | 25.0 | 16.7 | Do. |
| 6 | 25.0 | 58.3 | 16.7 | Poor; slow, very little nickel etched. |
| 7 | 33.3 | 50.0 | 16.7 | Fair; slow nickel etch. Upper limit for acetic acid. |
| 8 | 37.5 | 37.5 | 25.0 | Good; even etch. |
| 9 | 33.3 | 33.3 | 33.3 | Fiar; within 100 microinches. Upper limit for $H_2SO_4$. |
| 10 | 25.0 | 41.7 | 33.3 | Fair; within 100 microinches. Excellent definition. |
| 11 | 20.8 | 41.7 | 37.5 | Poor; very little nickel etched. Outside lower limit for $HNO_3$. |
| 12 | 41.7 | 25.0 | 33.3 | Fair; within 200 microinches. |
| 13 | 66.7 | 16.7 | 16.7 | Poor. Copper only attacked. Outside upper limit for $HNO_3$. |
| 14 | 65.0 | 25.0 | 10.0 | Fair; within 100 microinches. |
| 15 | 45.0 | 45.0 | 10.0 | Do. |
| 16 | 55.0 | 35.0 | 10.0 | Do. |

The composite bodies etched in the above examples included many species of nickel based and copper based metals. The etchant compositions were used both without water dilution and with water dilution, up to 1 part of etchant composition to 100 parts of water. Some samples of both the water diluted compositions and the non-diluted compositions were formed into thixotropic pastes and applied to the to-be-etched surfaces with good results. Time of etching was from 3 seconds, with the most reactive, undiluted and heated solutions, to as much as one-half hour with the highly diluted solutions. Most samples were tested at ambient temperatures; although, some samples had their temperatures raised to as much as 77° C. No signs of the evolution of nitrogen dioxide was noted in any of the examples.

PRIOR ART

Various etchant compositions prepared in accordance with the claims of U.S. Pats. 2,446,060 and 2,680,678 were prepared and applied at various dilutions to smeared transducers for various lengths of time. In no instance was any composition found which removed the smeared metals and produced a surface within a flatness of 200 microinches.

While the invention has been particularly shown and described with reference to preferred embodiments thereof, it will be understood by those skilled in the art that various changes may be made therein without departing from the spirit and scope of the invention.

What is claimed is:

1. A composition for chemically etching metals consisting essentially of:

concentrated nitric acid, glacial acetic acid, and concentrated sulfuric acid in amounts varying by volume of from about 25% to about 65% concentrated nitric acid, from about 25% to 50% glacial acetic acid, and from about 10% to 33% concentrated sulfuric acid.

2. The composition of claim 1 wherein the concentrated nitric acid is present in amounts of from about 35% to 58%, the glacial acetic acid is present in amounts of from about 25% to 42%, and the concentrated sulfuric acid is present in amounts of from about 16% to 30%, all by volume.

3. The composition of claim 1 wherein water is present on a volume basis of up to 100 parts of water to 1 part of etchant composition.

4. The composition of claim 3 wherein the concentrated nitric acid is present in the amount of about 41.7%, the glacial acetic acid is present in the amount of about 41.7%, and the concentrated sulfuric acid is present in the amount of about 16.7%, all by volume, and wherein water is present on a volume basis of about 2 parts of water to 1 part of etchant composition.

5. The composition of claim 1 wherein a nonreactive filler is added to form a thixotropic paste.

6. The method of simultaneously etching copper based and nickel based metals at an approximately equal rate which comprises:

contacting said metals with an acid solution consisting essentially of a mixture of concentrated nitric acid, glacial acetic acid, and concentrated sulfuric acid, which are present in relative percentages by volume of from about 25% to about 65% concentrated nitric acid, from about 25% to 50% glacial acetic acid, and from about 10% to 33% concentrated sulfuric acid.

7. The method of claim 6 wherein the concentrated nitric acid is present in amounts of from about 35% to 58%, the glacial acetic acid is persent in amounts of from about 25% to 42%, and the concentrated sulfuric acid is present in amounts of from about 16% to 30%, all by volume.

8. The method of claim 6 wherein water is present on a volume basis of up to 100 parts of water to 1 part of etchant composition.

9. The method of claim 8 wherein the concentrated nitric acid is present in the amount of about 41.7%, the glacial acetic acid is present in the amount of about 41.7%, and the concentrated sulfuric acid is present in the amount of about 16.7%, all by volume, and wherein water is present on a volume basis of about 2 parts of water to 1 part of etchant composition.

10. The method of claim 6 wherein a nonreactive filler is added to form a thixotropic paste.

References Cited

UNITED STATES PATENTS

| | | | |
|---|---|---|---|
| 2,446,060 | 7/1948 | Pray et al. | 156—18 |
| 3,565,708 | 2/1971 | Ellis | 156—18 |
| 3,598,741 | 8/1971 | Kanno | 252—79.3 |

JACOB H. STEINBERG, Primary Examiner

U.S. Cl. X.R.

252—79.4